Patented June 18, 1940

2,205,210

UNITED STATES PATENT OFFICE 2,205,210

CANDY WRAPPER

Theodore Rudolph Latour, Kenmore, N. Y., assignor to E. I. du Pont de Nemours & Company, Wilmington, Del., a corporation of Delaware No Drawing. Application July 1, 1939,
Serial No. 282,436

2 Claims. (Cl. 91—68)

This invention relates to wrappers for candy. More specifically, it relates to transparent wrappers which do not adhere to the surface of candy.

In accordance with modern trends of merchandising, it has been found desirable to wrap candies individually in transparent wrappers. This would be advantageous, both from the utilitarian angle because individual wrappers prevent certain types of candy pieces from sticking together, easy manipulation and sanitary handling of the candy; and from the esthetic viewpoint because the transparency feature allows the individual candy pieces having decorated surfaces and/or containing added ingredients such as chopped nuts (also fruit and the like) which add to the attractive appearance of the surface of the candy to be viewed by the purchaser. Where it is desired to distinguish different types of candy in a box, the wrapper may also, advantageously, be of a transparent nature because one type of wrapping tissue can be used. Otherwise a different kind of wrapper would be necessary to identify each kind of candy.

Since many types of candy are of a hygroscopic nature and tend to become soft and sticky in humid atmosphere or dry, bittle and discolored in atmospheres of low relative humidity, it is highly desirable that the wrapper used on individual pieces be of a moistureproof variety in order that the contents of a box may be exposed for some time after opening.

Of the common materials available heretofore for this purpose, mention may be made of nonfibrous cellulosic films such as the films of regenerated cellulose covered with moistureproofing compositions comprising nitrocellulose and wax. Candies wrapped in this material have not attained satisfactory public acceptance because the wrapper sticks to the surface of certain candies (for example, caramels and caramel-like candies, marshmallows, etc.) with such tenacity that the wrapper upon the candy is torn and shredded in attempts to remove the same. Furthermore, parts of the candy may adhere to the wrapper and be wasted. In many instances even when the wrapper is successfully removed, the candy is badly deformed and presents an unattractive appearance (due to the force and pressure required in separating it from the wrapper).

Attempts have been made to overcome the sticking of candy wrappers by such expedients as spraying a thin layer of paraffin over the candy surface and coating the candy with powdered materials like sugar and starch products. Such coatings very greatly impair both the appearance and the flavor of the confections.

It was, therefore, an object of this invention to provide new and improved wrappers for candies. A further object was to provide candy wrappers which would not adhere to the surface of candies of the caramel type. Still further objects were to provide transparent, moistureproof film suitable for wrapping candies and candy packages, in which the container for the candy was a transparent, moistureproof film of regenerated cellulose. A general advance in the art, and other objects which will appear hereinafter, are also contemplated.

It has now been found that candies of a sticky nature, such as caramels and like materials, do not adhere tenaciously to wrapping tissue consisting of transparent, non-fibrous, cellulosic film which has been coated with a composition comprising an organic solvent soluble cellulose ether film former and a wax moistureproofing agent. The presence of other materials, such as plasticizers, blending agents, etc., does not destroy the efficacy of the coating composition.

From the following description and specific examples, in which are disclosed certain embodiments of the invention as well as details of what is believed to be the best mode for carrying out the invention, it will be apparent how the foregoing objects and related ends are accomplished. The parts are given by weight throughout the application.

Example I

A film of regenerated cellulose .00088 inch thick was coated (by the procedure of United States Patent No. 1,737,187) on both sides with a coating comprising:

|  | Parts |
|---|---|
| Ethyl cellulose (organic solvent soluble) | 92 |
| High melting point paraffin (above 60° C.) | 8 |
| Toluene | 640 |
| Ethyl alcohol | 160 |

The volatile toluene and ethyl alcohol were removed by evaporation, leaving a coating .00006 inch thick on each side of the regenerated cellulose film. The film so coated was found to be highly moistureproof, transparent and to not adhere to the surface of caramels to more than a negligible extent, thereby making the removal of wrappers comprising this material very simple and satisfactory.

Example II

A film of regenerated cellulose was coated according to Example I with the following composition:

| | Parts |
|---|---|
| Ethyl cellulose (highly etherified) | 71 |
| Hydrogenated methyl abietate ("Hercolyn" grade, see U. S. P. 1,944,241) | 25 |
| High melting point paraffin wax (above 60° C.) | 4 |
| Toluene | 640 |
| Ethyl alcohol | 160 |

The film so produced was of good appearance, moistureproof, and was found to stick practically none at all to the surface of caramels and toffees when used as a wrapper therefor.

Example III

Film of regenerated cellulose was coated according to Example I, with the following composition:

| | Parts |
|---|---|
| Ethyl cellulose | 82 |
| Monolauryl phthalate | 15 |
| High melting point paraffin (above 60° C.) | 3 |
| Toluene | 640 |
| Ethyl alcohol | 160 |

Films so treated were found to be transparent and moistureproof and a highly satisfactory wrapper for caramels, toffees, and similar candies with a sticky surface.

Example IV

A film of cellulose acetate was coated with the following composition according to the process of Example I:

| | Parts |
|---|---|
| Ethyl cellulose | 70 |
| Dicyclohexyl phthalate | 10 |
| Modified rosin | 15 |
| High melting point paraffin (above 60° C.) | 5 |
| Toluene | 640 |
| Ethyl alcohol | 160 |

Films so treated were found to be highly moistureproof, transparent, and not to stick to the surface of caramels when used as a wrapper therefor.

Example V

Regenerated cellulose film was coated according to the process of Example I with the following composition:

| | Parts |
|---|---|
| Ethyl cellulose | 54 |
| Dicyclohexyl phthalate | 15 |
| "Modified rosin" (see U. S. Patents 2,017,866 and 2,147,180) | 25 |
| High melting point paraffin (above 60° C.) | 6 |
| Toluene | 640 |
| Ethyl alcohol | 160 |

The resulting film was found to be highly moistureproof and transparent, and very satisfactory as a wrapper for caramels, toffees, marshmallows, and chocolate coated confections.

Example VI

A film of regenerated cellulose was coated according to the process of Example I with the following composition:

| | Parts |
|---|---|
| Benzyl cellulose | 55 |
| Dicyclohexyl phthalate | 7.5 |
| Dimethyl cyclohexyl phthalate | 7.5 |
| Beckacite 1110 | 25 |
| High melting point paraffin (above 60° C.) | 5 |
| Toluene | 640 |
| Ethyl alcohol | 160 |

The resulting film was found to be highly moistureproof and transparent, and very satisfactory as a wrapper for caramels, toffees, marshmallows, and chocolate coated confections.

Beckacite 1110 is an ester gum-rosin and maleic acid glyceride mixture having a melting range of 119°–215° F. and an acid number of 17–22. This material is commercially available, and is one of a series of related maleic anhydride modified ester gum resins which may be used in the coatings of this invention.

In general, four types of coating compositions may be applied to the regenerated cellulose base. These are:

(1) Cellulose ether—wax.
(2) Cellulose ether—wax—resin.
(3) Cellulose ether—wax—plasticizer.
(4) Cellulose ether—wax—resin—plasticizer.

These coating compositions are made up and applied to the surface of the film by methods well known in the art, such as represented in U. S. Patents Nos. 1,737,187, 1,826,696 and 1,826,699.

In the four component systems the cellulose ether content may be varied from 50% to 90%, but the preferred range is from 65% to 75%. The plasticizer may be varied from 5% to 25%, with a preferred range of from 10% to 20%. The resin may be varied from 5% to 25%, with a preferred range of from 10% to 20%. The wax may be varied from 2% to 10%, the exact wax content being dependent upon the amounts of plasticizer and resin present in the coating composition.

As moistureproofing agents, it is possible to use waxes or wax-like materials. Such products as paraffin, petrolatum, ceresin, palm wax, beeswax, Chinese insect wax, synthetic waxes or wax-like materials, are preferred.

Suitable resins for use in the above compositions are damar, copal, kauri, polyhydric alcohol-polybasic acid resinous condensation products, vinyl derivatives, rosin, hydrogenated rosin, derivatives of rosin and hydrogenated rosin, and the like.

Representative plasticizers suitable for use in the above compositions include diphenyl lauramide, butyl toluene solfonamide, dibutyl phthalate, etc.

Various degrees of etherification of the ethyl cellulose are permissible such that the ethoxy content varies from 41% to 51%, and preferably from 45% to 48%. This high degree of ethylation gives a product which is organic solvent soluble. Comparable degrees of etherification are employed for the other ethers.

For the usual coating methods these compositions must be available in solutions, and for that purpose any of the usual solvents or solvent mixtures familiar to the skilled worker in the art will serve. Generally speaking, the solvent will contain a cellulose ether solvent and a wax solvent, as well as a solvent for the resins and plasticizers present, and optionally a diluent. Solvents for the base sheet obviously should not be employed in the coating composition. Satisfactory solvents and specific compositions including them are illustrated in the examples.

The invention has been described in terms of the desired moistureproofing coating compositions on cellulose film regenerated from viscose, but it is to be understood that various bases (other types of transparent, non-fibrous, cellulosic films) may likewise be used. Sheets or films of regenerated cellulose and the like, whether they be made by the viscose process, the cuprammonium process, or by any other manufacturing technique, are satisfactory. Sheets and films of lowly esterified cellulosic compositions, and low substituted cellulose ethers may also be used. Commercially available cellulose esters such as cellulose acetate and its equivalents are satisfactory. Cellulose derivatives (such as esters and ethers) soluble in the solvent of the coating composition are excluded.

The moistureproofing compositions may be cast into self-sustaining films by the usual procedures.

By satisfactory stick resistance on the surface of the candy, is meant that the film may be readily separated from the surface of the candy, without tearing or marring either the wrapping tissue or the surface of the candy, with such a small degree of force that the candy may be handled without distorting.

Moistureproofness and moistureproof materials are defined in U. S. Patent No. 2,147,180. In the interest of brevity the definitions are not repeated here. The terms related thereto and employed herein are used in accordance with such definitions.

The coating compositions of the examples are transparent and give wrapping material possessing permeability values of 40 or lower.

Among the candies requiring this type of wrapper, representative types are caramels, caramel-like candies, caramel-coated candies, toffees, marshmallows, candied fruits of a sticky nature, and to a lesser extent chocolates and chocolate-coated candies, bonbons and the like. The candies which give particular difficulty are the caramels, which, in addition to having a sticky surface, are generally cut into blocks with smooth faces, which in the course of wrapping operations are pressed tightly against the surface of the wrapping tissue with which they may, therefore, form a continuous and firm adhesive bond, which in the usual manner of boxing in closely packed rows and layers is further accentuated. Another type of candy which has also given great difficulty is that of the toffees.

Candies such as caramels, toffees, etc., wrapped in transparent, non-fibrous, cellulosic tissues such as regenerated cellulose, and coated with compositions comprising ethyl cellulose, benzyl cellulose (accumulated data, at present available, indicates that the ethyl and benzyl derivatives are particularly satisfactory), and the like, together with a moistureproofing agent, are found to be protected over long periods of time against contamination, change in appearance, and other undesirable and detrimental changes. They are, in addition, free from sticking together when packed in boxes, and may be readily handled without contamination, without soiling or making sticky the fingers.

Transparency of the wrapper, furthermore, makes possible a ready inspection and selection of pieces of candy in a box or collection, as well as enhancing the appeal of the packaged commodity.

The wrappers described in this invention may be readily removed from the sticky surface of certain types of candies, such as caramels, toffees, etc., with great ease and without distorting or marring the candy, or the wrapper removed. This is a great advantage over the wrappers heretofore available, which were removed only with great difficulty; in many cases the complete separation of candy and wrapper was not possible. By the use of these wrappers, it no longer becomes necessary to coat the surface of the candy with unsightly and deleterious materials to prevent sticking of the wrappers.

As many apparently widely different embodiments of this invention may be made without departing from the spirit and scope thereof, it is to be understood that this invention is not limited to the specific embodiments thereof except as defined in the appended claims.

I claim:

1. A transparent wrapping tissue for sticky candy, comprising essentially a sheet of regenerated cellulose having a moistureproof coating thereon, said coating comprising essentially 54% of ethyl cellulose etherified in the range 41% to 51% ethoxyl film former and 6% of high melting point paraffin wax moistureproofing agent together with 25% of "modified rosin" resin blending agent and 15% of dicyclohexyl phthalate plasticizer.

2. A transparent sheet wrapping material for sticky candy comprising essentially a sheet of regenerated cellulose having a moistureproof coating thereon, said coating comprising essentially 54% of ethyl cellulose etherified in the range 41% to 51% ethoxyl film former and 6% of moistureproofing agent together with 25% of resin blending agent and 15% of plasticizer.

THEODORE R. LATOUR.